Figure 1:
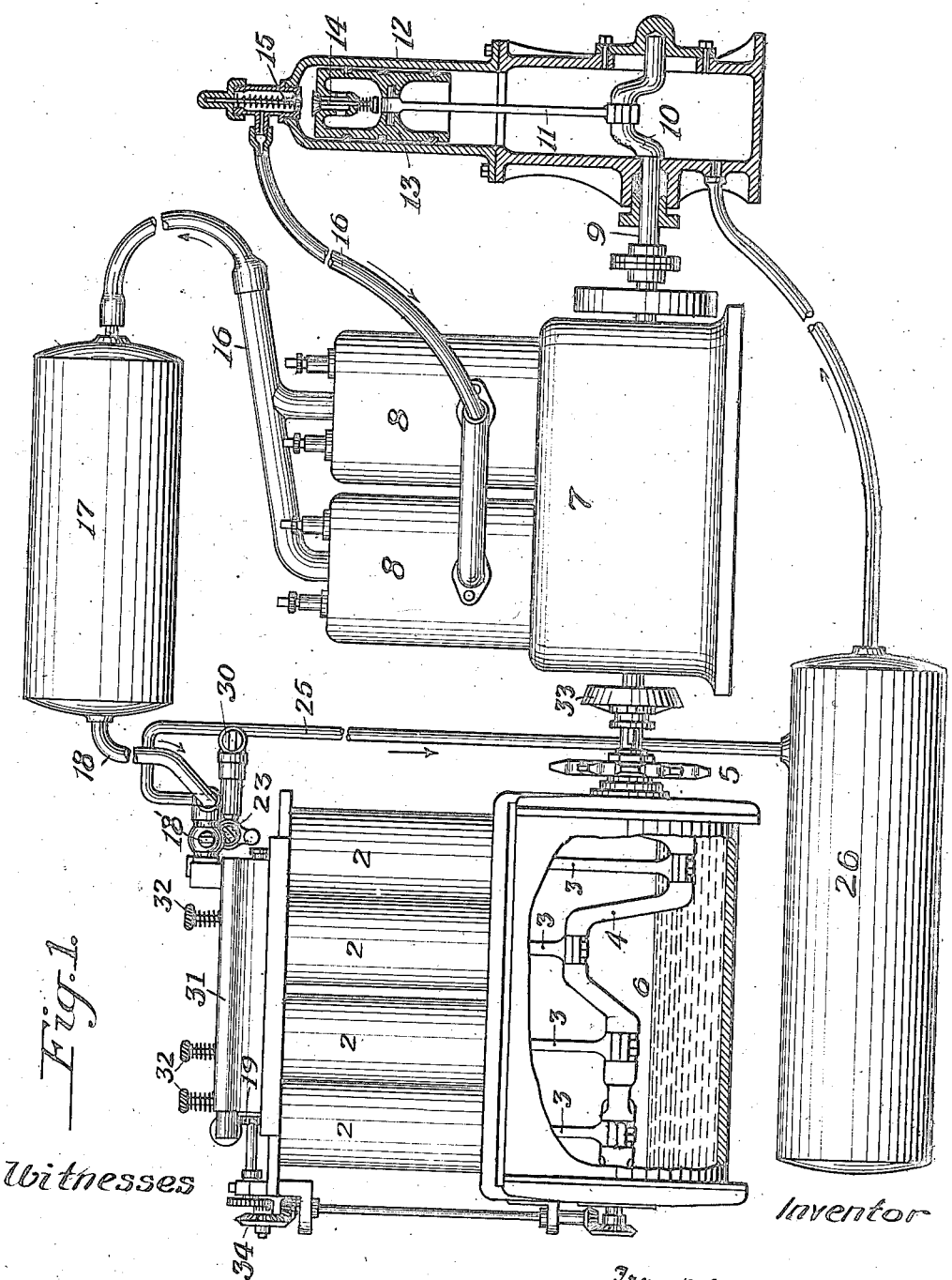

F. A. SNYDER.
MOTOR FOR VEHICLES.
APPLICATION FILED SEPT. 5, 1918.

1,301,614.

Patented Apr. 22, 1919.
3 SHEETS—SHEET 1.

Witnesses

Inventor
Franck A. Snyder
by James R. Bakewell
his attorney

F. A. SNYDER.
MOTOR FOR VEHICLES.
APPLICATION FILED SEPT. 5, 1918.
1,301,614.
Patented Apr. 22, 1919.
3 SHEETS—SHEET 2.
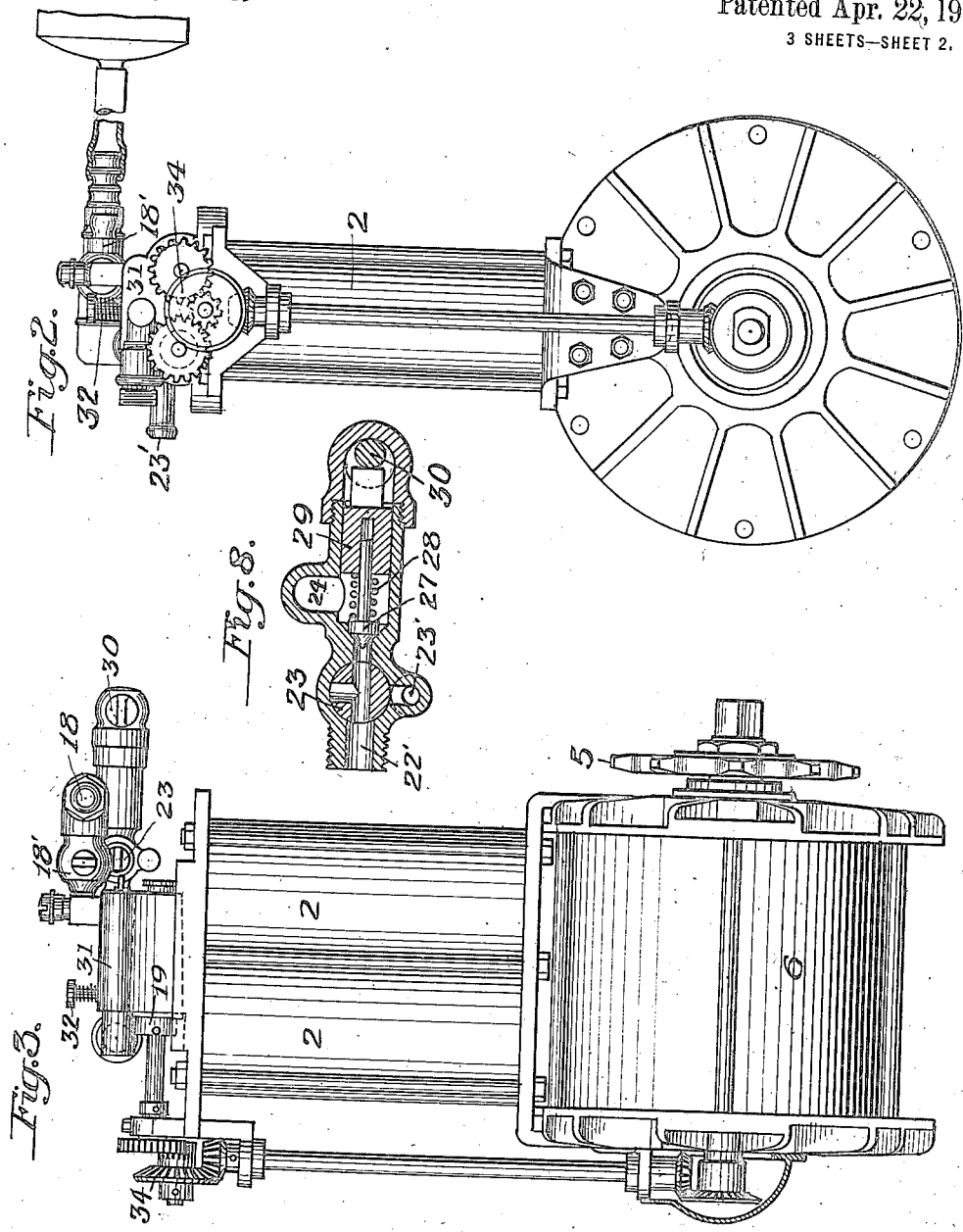

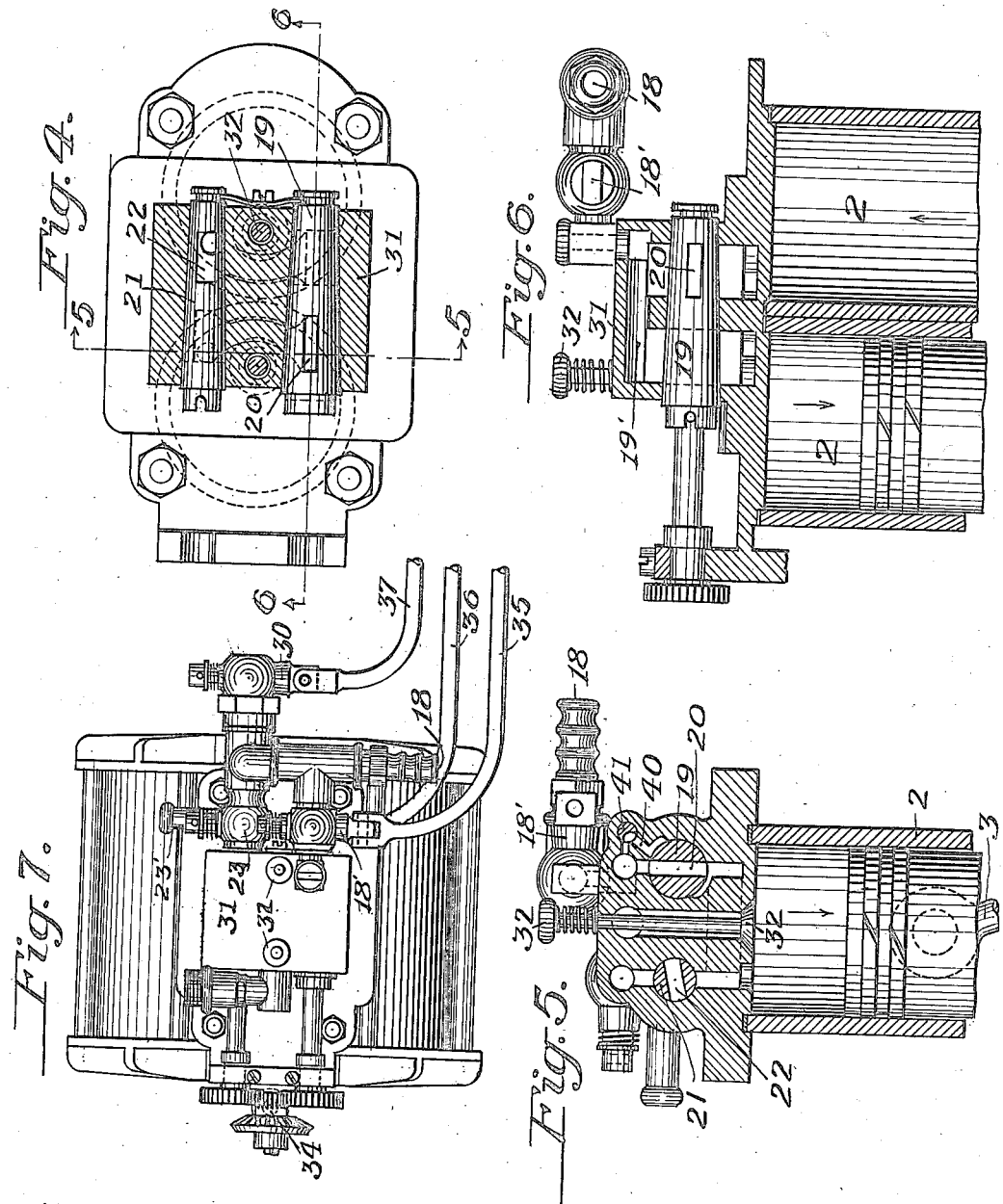

UNITED STATES PATENT OFFICE.

FRANK A. SNYDER, OF PITTSBURGH, PENNSYLVANIA.

MOTOR FOR VEHICLES.

1,301,614.  Specification of Letters Patent.  Patented Apr. 22, 1919.

Application filed September 5, 1918. Serial No. 252,690.

*To all whom it may concern:*

Be it known that I, FRANK A. SNYDER, of the city of Pittsburgh, in the county of Allegheny and State of Pennsylvania, have invented a new and useful Improvement in Motors for Vehicles, of which the following is a full, clear and exact description, reference being had to the accompanying drawings, forming part of this specification, in which—

Figure 1 is a side elevation of motors embodying my invention; Fig. 2 is an end elevation of a modification; Fig. 3 is a side elevation of the same; Fig. 4 is a horizontal sectional view illustrating the inlet and exhaust valves; Fig. 5 is a vertical sectional view on line 5—5 of Fig. 4; Fig. 6 is a vertical sectional view on the line 6—6 of Fig. 4; Fig. 7 is a plan view of the modification and Fig. 8 is a vertical sectional view of the brake valve.

Like symbols of reference indicate like parts where they occur.

My invention relates to an improvement in a motor to provide power for the propulsion of vehicles, such as street cars, automobiles, bicycles, etc., and it consists in devices for storing and utilizing compressed air as power for the vehicle. I will now describe my invention so that others skilled in the art may employ the same.

In Fig. 1 of the drawings I have shown a pneumatic motor, having four cylinders, 2, which may be of any suitable construction, having pistons connected with piston rods 3, pivoted to the crank shaft 4, which is provided with a sprocket wheel 5 through which driving power is imparted to the vehicle. This crank shaft 4 is preferably located in an oil crank case 6. Adjacent to the pneumatic motor is a gas engine having a crank and shaft casing 7 and cylinders 8—8, which engine may be of any suitable construction and type, the power shaft 9 of which is connected by a crank 10 with the piston rod 11 of an air compressor 12, which is provided with a piston 13 having a spring valve 14. At the upper end of the cylinder of the air compressor, 12, is a spring valve 15, which acts with the valve 14 to open and shut connection between the low pressure tank 26 and the high pressure tank 17 under the action of the piston 13, the compressed air passing through the conduit 16, which leads to the casing, 8, around the cylinders in the gas engine, and through this casing to the high pressure air tank 17, the purpose of passing the air from the cylinder 13 through the casing 8 being to cool the cylinders of the gas engine, the air being heated, whereby the power is increased. Leading from the cylinder 17 is an out-take air pipe 19, shown in detail in Figs. 4, 5 and 6, (see Fig. 6), in which there is a feed valve 19 controlling the supply of compressed air to the pneumatic cylinders 2. This valve 19, shown in detail in Figs. 4, 5 and 6, is tapered in form and is provided with two ports 20 which alternately serve as inlet ports to the four cylinders, the air passing from the port 20 into the valve chamber and from the valve chamber to the cylinder. Outside of the valve 19 is a by pass 40, (see Fig. 5), which is opened and closed by the cock 41, the purpose of this by pass being to admit air directly to the cylinders to start the engine should it be on a center. Parallel with the valve 19 and similarly located in the valve chamber is the tapered exhaust valve 21, which is provided with exhaust ports 22 which open alternately to the exhaust 22'. Located in the conduit is a cock 18', and in the exhaust 22' is a three way cock 23, having a port 23' which leads to the atmosphere, and a second port 24 which opens into the conduit 25 which opens into the low pressure cylinder 26. Between the port 24 and the conduit 26 is a spring valve 27, (see Fig. 8), which serves as a resistance to the exhaust, thereby acting as a brake to the motor to control the movement of the vehicle. Bearing against the spring 28 of the valve 27 is a sliding block 29 adapted to be moved by the cam 30, whereby the force of the spring 28 and the resistance to the air may be increased or lessened. On top of the air chamber 31 are intake puppet air valves 32 for supplying air to the cylinders, 2, when connection between the cylinders and the air tank by the valves 19 is closed.

The power shaft 4 of the pneumatic motor is connected with the shaft 9 of the gas engine by means of a clutch 33, whereby the gas engine may be started by power from the pneumatic motor.

The valves 19 and 21 are operated by the time gearing 34, which connects the valves with the shaft 4 of the motor. The cocks 18' and 23, and the cam 30, may be operated by suitable levers, the connecting rods of which are shown broken away at 35, 36 and 37 in Fig. 7.

The operation is as follows: In the motor as shown in Figure 1, the gas engine is started to pump air into the high pressure tank 17, the air being drawn into the cylinders 2 through the puppet air valves 32, and thence passing through the tank 26 to the pump 12, the three way stop cock 23 being adjusted to permit this passage of the air. When a sufficient amount of air has been compressed in the tank 17, the three way cock 23 is turned to exhaust into the atmosphere, and the stop cock 18' is opened which permits the air to pass to the cylinders 2, and the shaft 4 is driven, which drives the vehicle through the sprocket 5. When it is desired to stop the vehicle, the gas engine is stopped and the stop cock 18' is closed, which shuts off the passage of air from the tank 17. The three way cock 23 is then turned to cause the air which is pumped from the atmosphere by the cylinders 2 under the momentum of the vehicle to pass to the low pressure cylinder 26, and in case a quick stop is desired the cam 30 is turned to increase the force of the spring 28 and the resistance to the passage of the air from the cylinders. Thus the power incident to the momentum of the vehicle is partly stored in the tank 26 and is partly employed as a brake, and this operation is the same where in descending a grade it is desirable to apply a brake without stopping the movement of the vehicle.

Under such conditions the pressure in the tanks 17 and 26 becomes equal.

In certain cases, as where my improvement is to be used as an auxiliary motor, the auxiliary motor or gas engine 8 may be dispensed with, the air compressor 12 being connected with the main motor of the vehicle, as will be readily understood by those skilled in the art.

The advantages of my invention should be understood from the foregoing description by those skilled in the art.

What I claim and desire to secure by Letters Patent is:—

In a pneumatic motor for vehicles, the combination of a cylinder and piston, devices for connecting the piston with the running gear of the vehicle, a low pressure air reservoir connected with the cylinder, an air compressor and an auxiliary motor for driving the same, a high pressure air reservoir connected with the cylinder and with the air compressor, a connection between the cylinder and the low pressure reservoir, connections between the auxiliary air compressor and the low and high pressure air reservoirs, and devices for opening and closing the connections.

FRANK A. SNYDER.

Witnesses:
JAMES K. BAKEWELL,
M. A. KELLER.